Sept. 9, 1969 G. L. SHELTON, JR 3,466,603

SCANNER THRESHOLD ADJUSTING CIRCUIT

Filed June 22, 1965 2 Sheets-Sheet 1

INVENTOR.
GLENMORE L. SHELTON, JR

BY Edward G. Fiorito

ATTORNEY

SCANNER THRESHOLD ADJUSTING CIRCUIT

Filed June 22, 1965 2 Sheets-Sheet 2

3,466,603
SCANNER THRESHOLD ADJUSTING CIRCUIT

Glenmore L. Shelton, Jr., Carmel, N.Y., assignor to International Business Machines Corporation, Armonk, N.Y., a corporation of New York Filed June 22, 1965, Ser. No. 466,034
Int. Cl. G06k 9/00
U.S. Cl. 340—146.3 13 Claims

ABSTRACT OF THE DISCLOSURE

The threshold of an amplifier is adjusted by counting the number of samples contained within the trace of pattern "e." The samples taken by the scanner are thresholded by the amplifier and fed to a shift register. The first position of the register is fed to a counter which is advanced when a sample is taken from within the pattern. A group counter is connected to the shift register through an AND gate having four inputs from four adjacent positions of the shift register. The group counter is advanced when a one bit is in all those four positions. The values in counters are divided in a divider by the function $2(Q+1)/A$. The results of division are compared to minimum and maximum values in a discriminator. If the output of the divider exceeds maximum the threshold is raised. If the divider value is below minimum the threshold is lowered.

Figure 1:
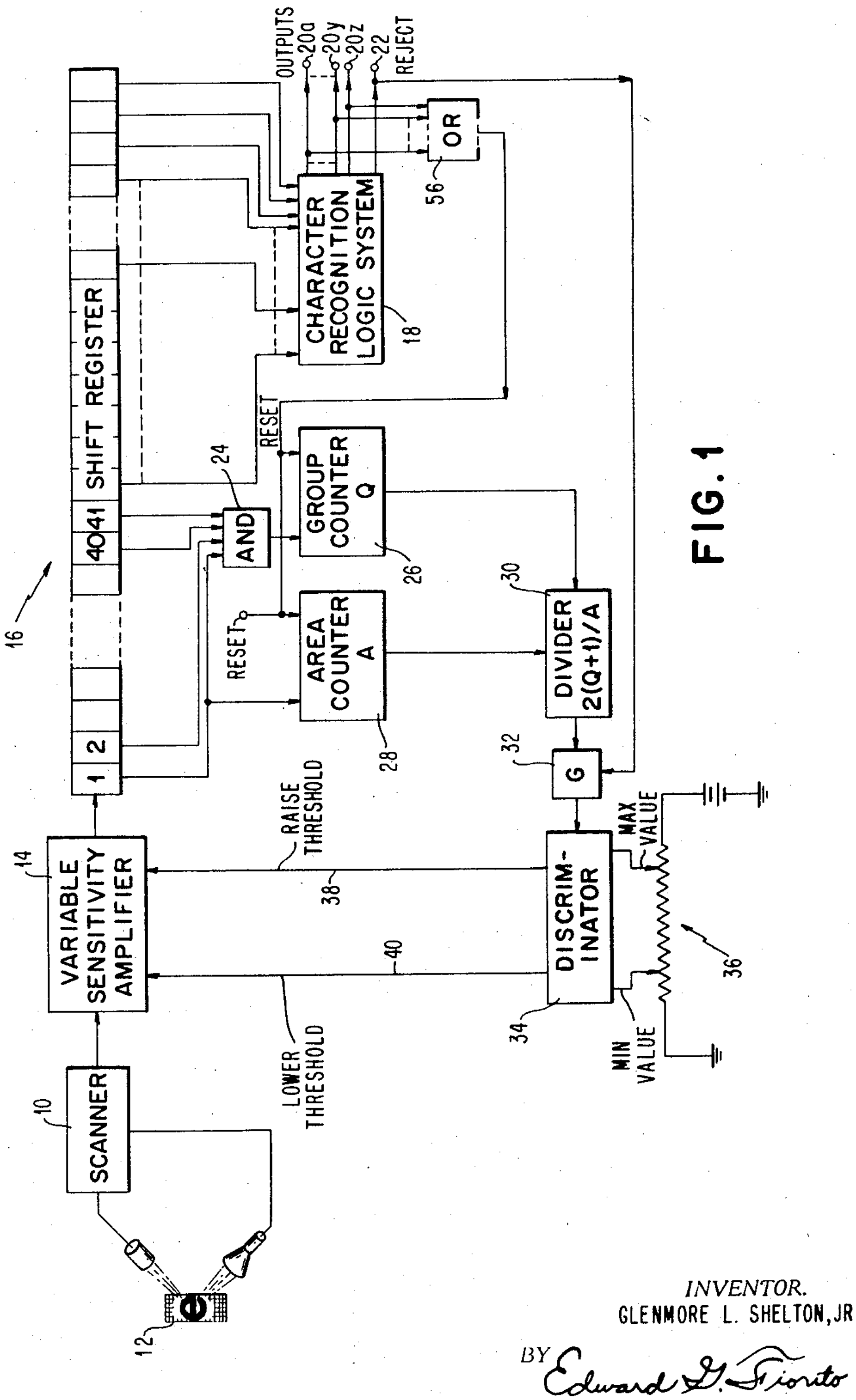

This invention relates to a system for adjusting the video clipping level of a raster scanning device, and more particularly to character recognition systems employing circuits to automatically adjust scanner threshold.

Character recognition systems often rescan a character a number of times if the character is not recognized on the first scan. It has been found that adjusting the parameters of the scanner before executing a rescan causes different data samples to be generated which increases the effectiveness of the character recognition system in identifying the unknown character. The video clipping threshold is one particular parameter which has been found to be useful in recovering rejected characters.

The clipping threshold is related to the shading of the character which is often not uniform. Many printing mechanisms cause the edges of the character to be grey or lighter, than the heavy dark center of the pattern trace. The video clipping level varies the scanner's response to the shades of the pattern trace. The dark centers produce signals which exceed the video clipping level of the scanner thereby generating output pulses. The lighter grey edges of the character produce signals which are below the video clipping level and cause no output from the scanner. Therefore by varying the clipping level of the scanner it has been found that the effective width of the pattern trace can be varied producing a corresponding variation in the output pulses generated by the scanner.

Commonly assigned co-pending application Ser. No. 353,329, now United States Patent No. 3,263,216, entitled "Pattern Recognition Error Correction System Employing Variable Parameter Input Devices" by M. C. Andrews illustrates one system which varies the clipping level of the scanner to recover rejected characters. The present invention is directed to another circuit for varying scanner clipping levels.

It is an object of the present invention to provide an improved character recognition system.

Another object of the present invention is to provide an improved method of adjusting scanner threshold.

A further object of the present invention is to provide an improved circuit for adjusting scanner threshold which can be added to many conventional character recognition systems without a substantial increase in hardware.

Still another object of the present invention is to provide an improved character recognition system capable of automatically adjusting the scanner threshold in response to rejected characters.

These and other objects of the present invention are accomplished by counting the number of positions a group of at least two adjacent samples occupy within the pattern trace. One preferred group of samples consists of a rectangular block of four samples. The number of times this block fits into the pattern trace in non-superimposed but overlapping positions is counted.

Also counted is the total number of samples contained in the pattern trace. The scanner threshold is then adjusted as a function of the ratio of the number of positions the block can occupy divided by the total number of samples contained in the pattern trace. If the ratio exceeds a predetermined maximum value, the scanner threshold is raised, causing the effective width of the pattern trace to be reduced. If the ratio falls below a certain minimum value the scanner threshold is lowered causing an effective increase in the width of the pattern trace.

The present invention can be added to many conventional character recognition systems employing shift registers or delay lines. One example of such a character recognition system is shown in commonly assigned co-pending, now abandoned, United States patent application Ser. No. 330,394 entitled "Specimen Identifying Computer" by J. Reines. In such system terms sample pulses are shifted through a shift register to which a character recognition logic system is connected.

In accordance with the present invention an AND gate is connected to a number of positions of the shift register and a counter is coupled to the output thereof. The output of the counter corresponds to the number of positions that the group of adjacent samples can occupy within the pattern trace. The AND gate and counter represent an efficient way of obtaining this measurement where a shift register is already needed for performing character recognition logic.

The foregoing and other objects, features and advantages of the invention will be apparent from the following more particular description of a preferred embodiment of the invention, as illustrated in the accompanying drawings.

Figures 2A, 2B:
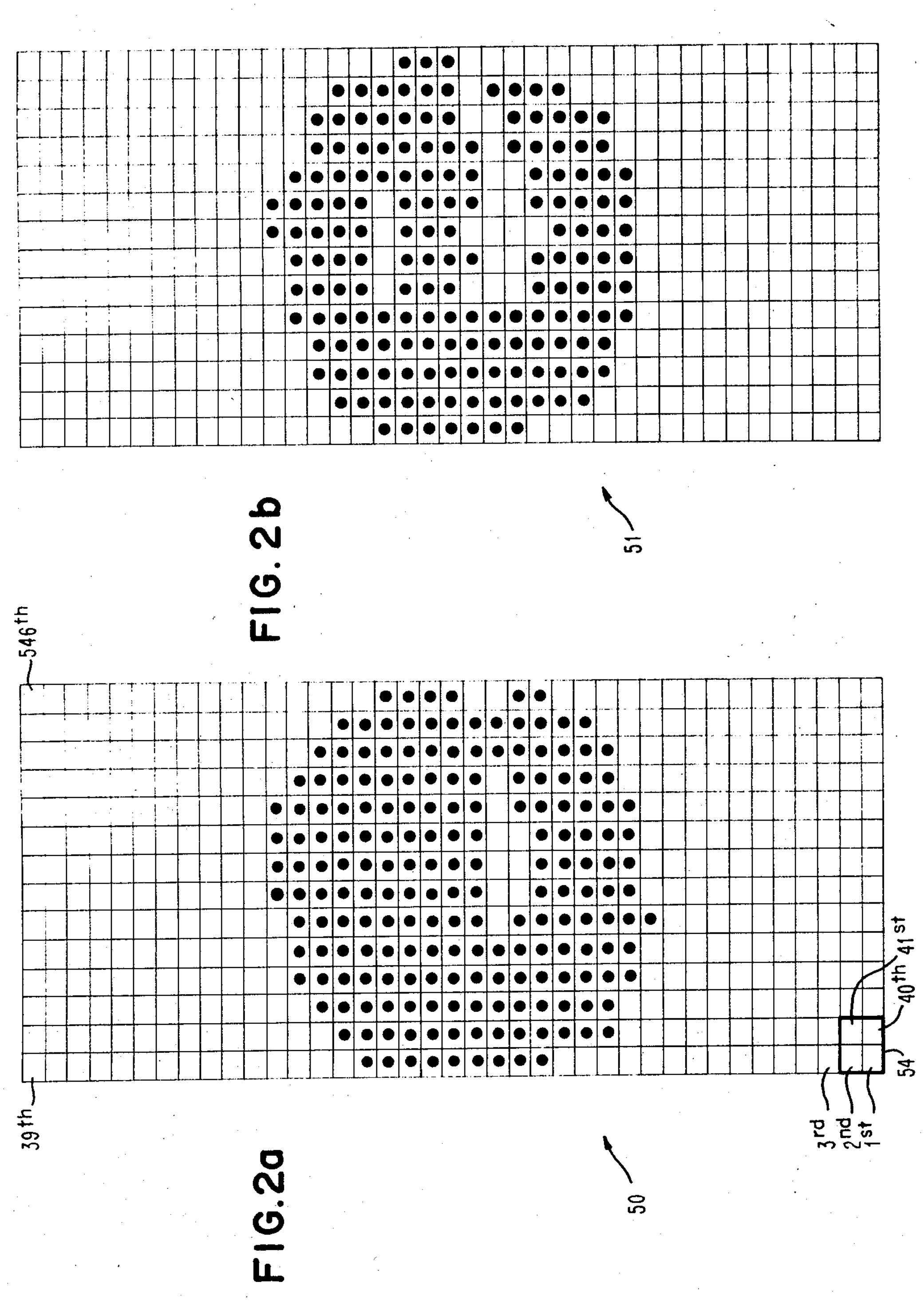

In the drawings:

FIG. 1 is a block diagram of a character recognition system embodying the present invention; and FIGS. 2*a* and 2*b* are graphs representing the pulses generated by the character recognition system shown in FIG. 1 before and after adjustment of scanner threshold.

A scanner 10 performs a rectilinear scan over the pattern trace of a character "e" printed on the document 12. The scanner 10 takes over 500 samples of the document 12 arranged in a coordinate array. When a sample is taken of the document 12 containing the dark pattern trace of the character "e," a pulse is sent from the scanner 10 to a variable sensitivity amplifier 14. If the height of the output pulse of scanner 10 is above a certain video clipping threshold, a pulse is provided from the amplifier 14. The threshold of the variable sensitivity amplifier 14 can be varied in a manner to be described below.

The output of amplifier 14 is fed to a shift register 16 containing over 500 bit positions. Every time a scanner 10 takes a sample the shift register advances the pulses stored therein one bit position.

A character recognition logic system 18 is connected to various positions of shift register 16. After all of the data samples collected by scanner 10 are shifted through register 16 the logic system 18 attempts to identify the unknown character on document 12. If the recognition is successful, a signal is provided on one of a group of output terminals 20$a$ through 20$z$. Where an unknown character on document 12 cannot be identified, logic system 18 provides a signal on a reject output 22. The details of the system described above can be found in the above identified abandoned application Ser. No. 330,394.

The remaining circuitry in FIG. 1 is added to automatically vary the threshold of amplifier 14. An AND gate 24 has four inputs connected to the 1st, 2nd, 40th and 41st positions of shift register 16. Each time these four positions of shift register 16 simultaneously contain data bits therein AND gate 24 provides a pulse to a counter 26. Another counter 28 is connected to the first position of shift register 16 and performs the function of counting the total number of data bits introduced into shift register 16.

The outputs from counters 26 and 28 are fed to a divider 30 which operates upon the counter values in a manner to be described below. A gate 32 passes the output from divider 30 to a discriminator 34 only in response to a reject signal on terminal 22.

Discriminator 34 examines the output of divider 30 coupled through gate 32 and compares it with minimum and maximum values provided by a potentiometer 36. If the signal supplied to discriminator 34 is above the maximum value, a control signal is supplied on a line 38 to amplifier 14 raising the threshold thereof. If the signal supplied to discriminator 34 is below the minimum value, a control signal is supplied on a line 40 to amplifier 14 lowering the threshold thereof. Subsequent rescans of the character on document 12 generate data with the new setting of the variable sensitivity amplifier 14. Details of amplifier 14 may be found in the above application Ser. No. 353,329 identified Patent No. 3,263,216.

To illustrate the operation of the scanner 10 and variable sensitivity amplifier 14 a pair of graphs 50 and 51 each containing 546 blocks are shown in FIGS. 2$a$ and 2$b$. Each block represents one sample of the character "e" on document 12 taken by the scanner 10. Beginning in the lower left hand corner of the graph 50 scanner 10 takes column of 39 samples. During this scan nine pulses are produced represented by the nine dots in the left hand column.

The scanner returns to the lower left corner of the graph 50 and takes another 39 samples beginning with the 40th sample at the bottom. The pulses are fed serially into shift register 16 which is advanced each time a sample is taken, whether or not a pulse is passed through amplifier 14. The entire array of pulses in graph 50 eventually is shifted through register 16.

In order to illustrate the operation of AND gate 24 heavy lines are drawn around the position of the 1st, 2nd, 40th and 41st sample taken by scanner 10 and will be referred to hereinafter as block 54. Starting on the left side of AND gate 24 the first and third input, as well as the second and fourth input of AND gate 24 are separated by 39 positions of shift register 16. In a like manner the 1st and 40th samples as well as the 2nd and 41st samples of scanner 10 are separated by 39 samples. As illustrated by the block 54 in FIG. 2$a$, the actual location of the 1st, 2nd, 40th and 41st samples on the document 12 is adjacent to one another forming a four sample block.

As described above when all four inputs of AND gate 25 are present simultaneously an output is provided. This corresponds on graph 50 to the presence of a block of four dots adjacent to one another. Since the entire array of sample pulses shown in graph 50 is shifted past the inputs of AND gate 24, a search is made through the entire array of dots in graph 50 to detect the presence of each of the different blocks of four adjacent dots. This search is equivalent to sweeping the block 54 through the entire graph 50 noting at each new position of the block whether four dots exist therein. There are 150 different positions in the graph 50 which block 54 can occupy and have four dots simultaneously contained therein. The number 150 will be referred to as the group count Q, and is the value contained in counter 26 after the array of samples shown in graph 50 is shifted through register 16.

The total number of dots in the graph 50 is 194. This value will be referred to hereinafter as the area A, and is the value contained in counter 28 after shifting the samples of graph 50 through register 16.

It has been found that a function of the ratio Q to A provides a good indication of whether the video clipping level should be adjusted. By inspecting the graph 50 it can be seen that the upper loop of the character "e" is completely filled, and no space exists on the right side between the top and bottom portion of the character "e." A more desirable array of sample pulses is shown in the graph 51 which was taken by the scanner 10 after the threshold of amplifier 14 was raised. The upper loop is opened up, and a space exists on the right side of the character "e." One function of the ratio Q to A found to provide successful operation is given by the equation:

$$2(Q+1)/A \qquad \text{Equation 1}$$

where Q is the value of counter 26, and A is the value in counter 28.

For the example shown in graph 50 where Q equals 150 and A equals 194, Equation 1 provides a ratio function of 1.58. In this case divider 30 provides an analog voltage of 1.58 volts. Assuming the character recognition logic system 18 failed to recognize the character of graph 50 a reject signal gates the output of divider 30 to discriminate at 34.

One maximum value for discriminator 34 found to be suitable for operation is 1.35 volts. Since the ratio function of 1.58 volts for the character of graph 50 is above this maximum value, discriminator 34 provides a signal on line 38 raising the threshold of amplifier 14.

The character "e" on document 12 is scanned once again producing the array of data pulses shown in graph 51, FIG. 2$b$. Prior to rescan counters 26 and 28 are reset so that new group Q and area A counts can be determined. For the array of data samples shown in graph 51 Q equals 117, A equals 166. In accordance with Equation 1 the ratio function equals 1.42. While this is above the maximum value of 1.35 volts provided by potentiometer 36, it is possible for the character recognition logic system 18 to recognize the character in graph 51. Therefore an output is provided on one of the terminals 20 corresponding to the character "e." The signal on this terminal 20 is fed back through an OR gate 56 to reset counters 26 and 28 in preparation for a new character scan. No signal is provided on reject terminal 22, causing gate 32 to block the output of divider 30.

A minimum value supplied by potentiometer 36 found to provide satisfactory operation is 1.1 volts. The minimum and maximum values can be varied according to the desired effective width of the pattern trace. Also the ratio function given by Equation 1 can be varied to suit a particular application. For example, divider 30 can be simplified by dropping the term $2/A$ from Equation $1=2(Q+1)/A=2Q/A+2/A$, leaving $2Q/A$. This modified ratio function $2Q/A$ simplifies the operation of divider 30 which merely produces the quotient of the value in counter 26 divided by the value in counter 28, and multiplies the quotient by an amplification factor of 2.

Another modification of the ratio function can be made by dividing the value of area counter 28 by the value in group counter 26, which is substantially an inversion of the modification proposed above. The minimum and maximum values of potentiometer 36 would be adjusted accordingly.

While the character recognition system illustrated in FIG. 1 performs a rescan of the unidentified character to develop a new array of data samples, the output of scanner 10 can be fed to two variable sensitivity amplifiers with different threshold settings. In this manner the data samples of both graphs 50 and 51 would be generated simultaneously. The data samples of graph 50 may be fed through shift register 16 first. The data samples of graph 51 may be fed to an auxiliary buffer register (not shown) where they are stored until an attempt is made to recognize the pattern in graph 50. If recognition is not successful, the contents of the auxiliary buffer storage may be fed through shift register 16 thereby eliminating the necessity of executing a rescan operation.

Still another modification can be made to the present invention by permitting the output of divider 30 to be applied to discriminator 34 each time a character is presented for recognition whether or not character recognition logic system 18 is successful. In this manner, the scanner threshold is continuously monitored making necessary change in the video clipping level even prior to the occurrence of a reject.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method of adjusting the threshold of sensitivity of a scanner taking samples of a pattern trace, comprising the steps of:

scanning with a scanner for detecting as an array of samples those portions of a pattern trace providing a scanner response beyond a selectively variable threshold of sensitivity of said scanner in a selected direction;

counting the number of samples, within said array of samples, which had been detected by said scanner during a scan of said pattern trace at an initial level of said threshold;

counting the number of times at least two adjacent detected portions of said trace are present within said array of samples of the pattern trace;

and adjusting the threshold of sensitivity of the scanner in response to a function of said two numbers.

2. A method of using a raster scanner and adjusting the threshold of sensitivity of said raster scanner yielding a coordinate array of samples of a pattern trace, comprising the steps of:

scanning with a raster scanner having a selectively variable threshold of sensitivity for detecting and yielding samples of those spaces in a pattern trace beyond said threshold in a selected direction;

counting the total number of an initial array of samples which had been detected at an initial threshold of said scanner which samples are derived from a scan of said pattern trace;

counting the number of times at least two adjacent detected spaces are present within said initial array of samples from said pattern trace; and adjusting the threshold of sensitivity of said scanner as a function of said number of positions with respect to said total number of samples.

3. A method of adjusting the video clipping level of a scanner converting samples of a pattern trace of varying intensity into electrical signals, comprising the steps of:

counting the total number of samples detected by said scanner, contained in the entire pattern trace;

counting the number of times non-superimposed overlapping positions a group of at least two adjacent samples which had been detected can occupy within the pattern trace;

forming a ratio function of said number of positions to said total number of samples; and raising said video clipping level if said ratio is above a certain minimum value, and lowering said video clipping if said ratio is below a certain minimum value.

4. Apparatus for adjusting the threshold of sensitivity of a scanner for detecting as an array of samples those spaces in a pattern trace providing a scanner response providing an input beyond a threshold of sensitivity in a selected direction, comprising:

means for counting the number in an array of samples which had been detected by a scanner at an initial level of said threshold of sensitivity which samples are derived from said pattern trace;

means for counting the number of times at least two adjacent detected spaces are present within said array of samples from the pattern trace; and means for adjusting said threshold of sensitivity of said scanner as a function of said two numbers.

5. Apparatus for adjusting the threshold of a raster scanner for detecting as a coordinate array of samples those spaces in a pattern trace providing a scanner input beyond a threshold of sensitivity in a selected direction, comprising:

first means for counting the total number in an array of samples which had been detected by a scanner at an initial level of said threshold which samples are derived from said pattern trace;

second means for counting the number of times at least two adjacent detected spaces are present within said array of samples from said pattern trace; and means connected to said first and second means for adjusting the threshold of said scanner in response to and as a function of the ratio of said number of positions to said total number of samples.

6. Apparatus for adjusting the video clipping level of a scanner converting samples of a pattern trace of varying intensity into electrical signals, comprising:

first means for counting the total number of samples, detected by said scanner, contained in the entire pattern trace;

second means for counting the number of times non-superimposed overlapping positions a group of at least two adjacent samples which had been detected can occupy within the pattern trace;

third means connected to said first and second means for forming a ratio function of said number of positions to said total number of samples; and means connected to said third means for raising said video clipping level if said ratio is above a maximum value, and for lowering said video clipping level if said ratio is below a minimum value.

7. Apparatus as defined in claim 6 wherein said group includes a square array of four adjacent samples, and each position counted by said second counting means overlaps at least four other positions counted by said counting means.

8. Apparatus as defined in claim 7 wherein said third means forms the ratio given by the following formula:

$$2(Q+1)/A$$

where A is said total number of samples and Q is said number of positions.

9. In a pattern recognition system employing a scanner having an adjustable video clipping level for taking samples of a pattern trace of varying intensity and providing electrical signals each time the intensity of the samples exceeds said clipping level, and a shift register connected to the output of said scanner and having a plurality of positions through which said electrical signals are shifted, the combination of:

first counting means for counting the number of electrical signals produced during the scanning of a character;

a logical AND gate having inputs connected to at least two positions of said shift register;

a second counter for counting the number of outputs provided by said AND gate;

divider means connected to the output of said counters for forming a ratio function thereof; and discriminator means connected to the output of said divider means for adjusting said clipping level in response to the value of said ratio.

10. Apparatus as defined in claim 9 wherein said ratio function includes the quotient of the value of said second counter divided by the value of said first counter, and said discriminator means raises said clipping level when the ratio formed thereby is above a certain maximum, and lowers the clipping level when the ratio is below a certain maximum.

11. A character recognition system, comprising:

a scanner having an adjustable video clipping level for taking samples of a character trace of varying intensity and providing electrical signals each time the intensity of the samples exceeds said clipping level;

a shift register connected to the output of said scanner and having a plurality of positions through which electrical signals are shifted;

a first counting means for counting the number of electrical signals produced during the scanning of a character;

a logical AND gate having inputs connected to at least two positions of said shift register;

a second counter for counting the number of outputs provided by said AND gate;

divider means connected to the output of said counters for forming a ratio function thereof;

character recognition logic means connected to positions of said shift register for providing recognition outputs if the character is recognized, and providing a reject output if the character is not recognized;

gating means connected to the output of said divider means and to said reject output for gating said ratio therethrough only in response to the presence of said reject outputs; and discriminator means connected to the output of said gating means for adjusting said clipping level in response to the value of said ratio.

12. Apparatus as defined in claim 11 further characterized by:

the addition of means connected to said recognition outputs for resetting said counters in response to the recognition of a character.

13. Apparatus as defined in claim 11 wherein said ratio function includes the quotient of the value of said second counter divided by the value of said first counter, and said discriminator means raises said clipping level when the ratio formed thereby is above a maximum value, and lowers the clipping level when the ratio is below a minimum value.

References Cited

UNITED STATES PATENTS

| | | | |
|---|---|---|---|
| 3,069,079 | 12/1962 | Steinbuch et al. | 340—146.3 |
| 3,106,699 | 10/1963 | Kamentsky | 340—146.3 X |
| 3,219,974 | 11/1965 | Rabinow | 340—146.3 |
| 3,275,985 | 9/1966 | Dunn et al. | 340—146.3 |
| 2,940,005 | 6/1960 | Toulon | 178—6 |
| 3,128,338 | 4/1964 | Teacher | 178—6 |

MAYNARD R. WILBUR, Primary Examiner

SOL SHEINBEIN, Assistant Examiner

U.S. Cl. X.R.

178—7.2; 235—92